United States Patent
Wilks

(10) Patent No.: US 11,192,799 B1
(45) Date of Patent: *Dec. 7, 2021

(54) APPARATUS FOR HEATING AND DISTILLATION OF FLUID

(71) Applicant: Freeman Wilks, Sunrise, FL (US)

(72) Inventor: Freeman Wilks, Sunrise, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/896,189

(22) Filed: Jun. 8, 2020

Related U.S. Application Data

(63) Continuation-in-part of application No. 16/350,786, filed on Jan. 14, 2019, now Pat. No. 10,675,555, which is a continuation of application No. 16/350,045, filed on Sep. 18, 2018, now abandoned.

(60) Provisional application No. 62/709,547, filed on Jan. 22, 2018.

(51) Int. Cl.
| | |
|---|---|
| *C02F 1/04* | (2006.01) |
| *B01D 3/42* | (2006.01) |
| *B01D 5/00* | (2006.01) |
| *B01D 1/00* | (2006.01) |

(52) U.S. Cl.
CPC .............. *C02F 1/04* (2013.01); *B01D 1/0017* (2013.01); *B01D 3/42* (2013.01); *B01D 5/0006* (2013.01); *B01D 5/009* (2013.01)

(58) Field of Classification Search
CPC ........... C02F 1/04; B01D 1/0017; B01D 3/42; B01D 5/0006; B01D 5/009
See application file for complete search history.

(56) References Cited

U.S. PATENT DOCUMENTS

| | | | | |
|---|---|---|---|---|
| 3,956,072 A | * | 5/1976 | Huse | B01D 1/289 202/177 |
| 4,339,307 A | * | 7/1982 | Ellis, Jr. | C02F 1/18 202/176 |
| 4,690,102 A | * | 9/1987 | Sundquist | C02F 1/16 202/166 |
| 5,076,349 A | | 12/1991 | Kadono et al. | |
| 5,597,453 A | | 1/1997 | Sears | |
| 6,294,054 B1 | * | 9/2001 | Sutter | B01D 3/10 202/176 |
| 6,846,388 B2 | * | 1/2005 | Wilks | B01D 1/0017 126/232 |

(Continued)

*Primary Examiner* — Jonathan Miller
(74) *Attorney, Agent, or Firm* — Mark C. Johnson; Johnson Dalal

(57) ABSTRACT

An apparatus for heating fluid and distilling fluid includes a main tank for containing fluid to be heated by a main gas heater, the main gas heater including a pilot light for heating the main tank, a condensing tank for passing fluid to the main tank, the condensing tank containing one or more heat conducting rods that allow heat to be conducted to the lower region of the condensing tank, an evaporator tank for vaporizing fluid received therein, the evaporator tank being heated by the pilot light, a condensing coil, disposed in the condensing tank, for exchanging heat between fluid vaporized by the evaporator tank and fluid in the condensing tank, a holding tank for receiving fluid from a main source, a delaying float bowl tank to receive fluid from the holding tank, the delaying float bowl tank including a first fluid flow regulator for regulating fluid flow to the evaporator tank according to an amount of fluid in the delaying float bowl tank, and a distillate tank for receiving condensed fluid from the condensing coil.

19 Claims, 2 Drawing Sheets

(56) References Cited

U.S. PATENT DOCUMENTS 7,368,040 B2 * 5/2008 Wilks .................. B01D 1/0017
          137/11
2012/0006670 A1  1/2012 Kamen et al.

* cited by examiner

APPARATUS FOR HEATING AND DISTILLATION OF FLUID

CROSS-REFERENCE

This application is a continuation in part to U.S. Ser. No. 16/350,045, filed Sep. 18, 2018, which claims the benefit of provisional application Ser. No. 62/709,547 filed on Jan. 22, 2018, the entirety of which is incorporated by reference.

BACKGROUND

Currently, the cost of distilled water for drinking purposes or other forms of human consumption is uneconomical. Some conventional apparatuses have been proposed for economical drinking water distillation. One apparatus includes a water heater and distiller apparatus in which condensing steam in the distilling portion of the apparatus gives up its latent heat to water which is being heated in the water heating portion of the apparatus. However, the device promotes the use of separate or auxiliary heating elements and controlling energizing thereof based on an amount of fluid in a boiler. See, for example, U.S. Pat. No. 4,690,102, issued Sep. 1, 1987, to G. Sundquist, for Water Heater and Distiller Apparatus and U.S. Pat. No. 5,304,286, issued Apr. 19, 1994, to D. G. Palmer, entitled Water Supply System.

Another device includes a feed water intake which provides water in excess of the distilled water output, a heater controlling the quantity of water boiled, a waste water exit port to remove accumulated water above a certain level, a distilled water exit port in the vapor space, a condensing device to transfer the heat of condensation to a hot water tank and a waste water heat exchange device to transfer heat from a waste water to the hot water tank. See, for example, U.S. Pat. No. 4,601,789, issued Jul. 22, 1986, to J. G. Bjorklund entitled Water Purification Apparatus.

BRIEF SUMMARY

According to an embodiment of the disclosed subject matter, an apparatus for heating fluid and distilling fluid includes a main tank for containing fluid to be heated by a main gas heater, the main gas heater including a pilot light for heating the main tank, a condensing tank for passing fluid to the main tank, the condensing tank containing one or more heat conducting rods that allow heat to be conducted to the lower region of the condensing tank, an evaporator tank for vaporizing fluid received therein, the evaporator tank being heated by the pilot light, a condensing coil, disposed in the condensing tank, for exchanging heat between fluid vaporized by the evaporator tank and fluid in the condensing tank, a holding tank for receiving fluid from a main source, a delaying float bowl tank to receive fluid from the holding tank, the delaying float bowl tank including a first fluid flow regulator for regulating fluid flow to the evaporator tank according to an amount of fluid in the delaying float bowl tank, and a distillate tank for receiving condensed fluid from the condensing coil.

The evaporator tank can be connected to the delaying action tank to receive fluid from the delaying action tank.

The apparatus can further include a pump connected to the distillate tank for pumping fluid from the distillate tank.

The first fluid flow regulator can be configured to regulate fluid flow to the evaporator tank by preventing or allowing fluid flow from the holding tank to the delaying action bowl tank.

The first fluid flow regulator can be implemented as a first float connected to a first shaft, the first shaft having interval control flanges disposed to engage opposite sides of a lever arm that opens or closes a stopper that can prevent fluid from flowing from the holding tank into the delaying action tank.

The distillate tank can include a second fluid flow regulator for regulating fluid flow to the evaporator tank according to an amount of fluid in the distillate tank.

The second fluid flow regulator can be configured to regulate fluid flow to the evaporator tank by regulating fluid flow from the holding tank to the delaying action tank.

The second fluid flow regulator can be implemented as a second float connected to a second shaft, the second shaft having interval control flanges disposed to engage opposite sides of a lever arm that opens or closes a stopper that can prevent fluid from flowing from the holding tank into the delaying action tank.

The apparatus can also include a deactivation tank to receive overflow fluid from the distillate tank, the deactivation tank including a second fluid flow regulator for regulating fluid flow to the evaporator tank according to an amount of fluid in the distillate tank The second fluid flow regulator can be implemented as a second float connected to a second shaft, the second shaft having interval control flanges disposed to engage opposite sides of a lever arm that opens or closes a stopper that can prevent fluid from flowing from the holding tank into the delaying action tank.

The apparatus can further include a pump connected to the distillate tank and the deactivation tank for pumping fluid from the distillate tank and deactivation tank.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

The present invention is directed to a method and device for heating water, e.g., for household use, and for concurrently providing distilled water, e.g., for drinking (a thermostil). In the device, the energy used to distill water is then used to heat water in, say, a water heater, thus providing a very economical technique for obtaining clean drinking water.

Figure 1:
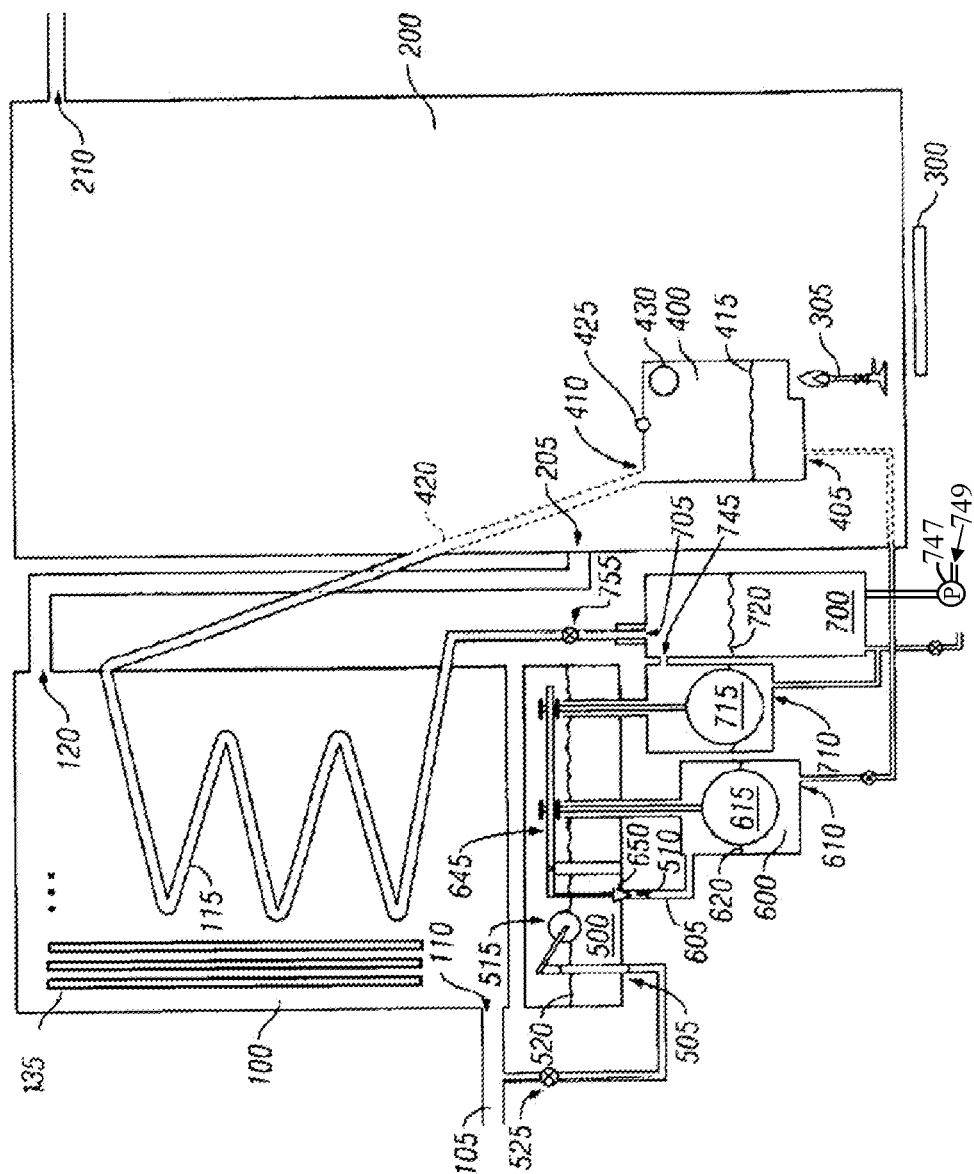
FIG. 1 shows a schematic view of an embodiment of the disclosed subject matter.

The invention is a method and an apparatus for providing heated and distilled fluid. Referring to FIG. 1, the apparatus includes a condensing tank 100 for receiving fluid, receiving vapor and condensing the vapor into a liquid form, a main tank 200 for receiving and heating preheated fluid from condensing tank 100, a heater 300, having a pilot light 305, for heating fluid in main tank 200, an evaporator 400, for vaporizing fluid received therein with heat from pilot light 305, a holding tank 500, for supplying fluid to evaporator 400, a delaying action tank 600, for regulating fluid flow from holding tank 500 to evaporator 400, and a distillate tank 700, for receiving condensate from the vaporized fluid.

Condensing tank 100 receives fluid from a main supply 105 at an inlet 110. Fluid from inlet 105 passes up through condensing tank 100, across a condensing coil 115 disposed therein, and passes out of condensing tank 100 via outlet 120. Condensing coil 115 exchanges heat between vaporized fluid passing through condensing coil 115 and fluid received in condensing tank 100, as described below.

Since heated portions of the fluid in condensing tank 100 rise relative to cooler portions thereof, outlet 120 is vertically superior to inlet 110 to exploit this natural physical law and pass heated fluid from condensing tank 100 to main tank 200, thereby conserving energy by reducing the amount of heat needed to heat fluid in main tank 200.

Main tank 200 receives fluid from condensing tank 100 via inlet 205. Inlet 205 can be connected to the main tank 200 at a relatively lower section of the main tank 200 to deliver fluid to the cooler region within the main tank 200 and also to deliver the fluid closer to the heat source. Heated fluid is drawn from main tank 200 for ordinary home usage via outlet 210. Similar to condensing tank 100, outlet 210 is vertically superior to inlet 205 so that the hottest fluid is drawn from main tank 200.

Heater 300 is arranged relative to main tank 200 to heat fluid therein. Heater 300 can be fueled by any energy source, such as oil, gas or solid fuel, so long as heater 300 has a pilot light 305 for igniting the same for intermittent, controlled burning and heating of the fluid.

Pilot light 305 is arranged relative to evaporator 400 to heat fluid therein in a conventional manner. As is conventional to many gas applications, pilot light 305 burns continuously, barring interrupted gas service, malfunction or other unanticipated incidents. Consequently, pilot light 305 provides a continuous source of heat for heating fluid in evaporator 400, which otherwise goes untapped in conventional systems.

Fluid in evaporator 400 is continuously heated by pilot light 305 such that some of the fluid evaporates. The vaporous, evaporated fluid passes from evaporator 400, via outlet 410, into conduit 420. Preferably, conduit 420 is insulated. Vaporized fluid from conduit 420 passes into condensing coil 115 that have extended length in condensing tank 100 and so allows for extended stay of the vapor in the coils 115 that are themselves immersed in the water or other fluid in condensing tank 100. Water is itself a poor conductor of heat and warmer water has a lower density than colder water, so it will naturally float over colder water and not allow for the homogenous dissemination of heat to the water in the condensing tank 100. Conducting rods 135 therefore improve the distribution of heat in condensing tank 100 by conducting heat to the bottom of condensing tank 100. Conducting rods 135 can be formed, for example, of aluminum or some other material with adequate heat conduction properties and be disposed in one or more areas within the condensing tank 100.

Fluid condensed in coil 115, under the influence of gravity, passes to distillate tank 700 through an inlet 705. Distilled fluid is drawn from distillate tank 700 via an outlet 735 which may include a pump (not shown) to feed a tap.

The disclosed system includes several control measures to automatically monitor and regulate the amount of fluid in the evaporator 400 and distillate tank 700 to prevent an overflow or an unnecessary stoppage of the distillation process. These control measures can include a first fluid regulator and a second fluid regulator that can be implemented through the use of a holding tank 500, delaying action tank 600 and deactivation tank 710.

Holding tank 500 receives fluid from main supply 105 at an inlet 505. Fluid passes from holding tank 500 via outlet 510. A float switch 515 monitors or corresponds to and regulates the amount of fluid received in holding tank 500. When the fluid level 520 in holding tank 500 falls below a predetermined level, float switch 515 influences a valve (not shown) to open, permitting fluid from main supply 105 to enter holding tank 500. When fluid level 520 reaches or exceeds the predetermined level, float switch 515 influences the valve (not shown) to close, prohibiting fluid from main supply 105 from entering holding tank 500.

A valve 525 regulates fluid communication between main supply 105 and holding tank 500. Valve 525 can prohibit flow to holding tank 500, for example, to enable installation, maintenance, repair, replacement, etc. thereof or other downstream structures.

Fluid passes from holding tank 500 to delaying action tank 600 via inlet 605. As a first fluid regulator, float 615 monitors or corresponds to and regulates the amount of fluid received in delaying action tank 600. Fluid passes from delaying action tank 600 to the evaporator 400 via outlet 610. Delaying action tank 600 and evaporator 400 are disposed in a common plane such that the elevation level of fluid in the evaporator 400 is the same as the elevation level of fluid in the delaying action tank 600.

When the fluid level 620 in the delaying action tank 600 reaches a pre-determined level, buoyant force acting on float 615 cause the float to influence lever arm 645 to close a stopper 650 or a valve (not shown) at outlet 510 in the holding tank 500. For example, in one embodiment float 615 can be connected to a shaft, the shaft having interval control flanges disposed on either side that engage lever arm 645, as shown in FIG. 1. The spacing of the flanges can control the timing of float 615 influencing lever arm 645 relative to the water level 620. In this manner float 615 functions as a first fluid flow regulator by closing stopper 650 to allow an amount of fluid in the evaporator 400 to evaporate before fluid is again allowed into the delaying action tank 600, and by extension of the system as disclosed, back into the evaporator 400.

As fluid is heated and evaporates from the evaporator 400, float 615 falls simultaneously with that of the water level in the evaporator 400 (recall that the elevation level of fluid in the evaporator 400 is always the same as the elevation level of fluid in the delaying action tank 600). When the water level in the evaporator 400 falls to a preset level, float 615 in delay tank 600 is no longer influenced by a buoyant force and this allows gravitational force acting on the float 615 to lower the float 615, thereby lowering lever 645 to influence the opening of the stopper 650 or valve (not shown) in the holding tank 500 at outlet 510, thereby allowing water to flow into the delaying action tank 600, and by extension to the evaporator 400.

When the fluid in distillate tank 700 reaches a predetermined level the fluid from said distillation tank 700 overflows to deactivation tank 710 through conduit 745. As a second fluid regulator, a float 715 in deactivation tank 710 monitors or corresponds to the level of fluid in deactivation tank 710. As the float 715 rises with the fluid level it engages lever arm 645 to close of the valve at outlet 510 in the holding tank 500. Similar to float 615, in one embodiment float 715 can be connected to a shaft, the shaft having interval control flanges disposed on either side of that engage lever arm 645, as shown in FIG. 1. The spacing of the flanges can control the timing of float 715 influencing lever arm 645 relative to the water level 720. In this manner float 615 functions as a first fluid flow regulator by closing stopper 650 to allow the fluid in the distillate tank 700 and deactivation tank 710 to be used before fluid is again allowed into the delaying action tank 600, and by extension into the evaporator 400.

As fluid is drained from distillate tank 700 and deactivation tank 715 float 715 falls simultaneously with that of the water level in the distillate tank 700. When the water level in the distillate tank 700 falls to a preset level, float 615 in delay tank 600 is no longer influenced by a buoyant force of float 715 and this allows gravitational force acting on the float 615 to lower the float 615, thereby lowering lever 645 to influence the opening of the stopper 650 or valve (not shown) in the holding tank 500 at outlet 510, thereby allowing water or other fluid to flow into the delaying action tank 600, and by extension into the evaporator 400. Float 615 will continue to rise under a buoyant force and falls under gravity and falls to allow for timely evaporation of fluid in evaporator 400. The cycle of float 615 is arrested at a predetermined level of float 715.

Figure 2:
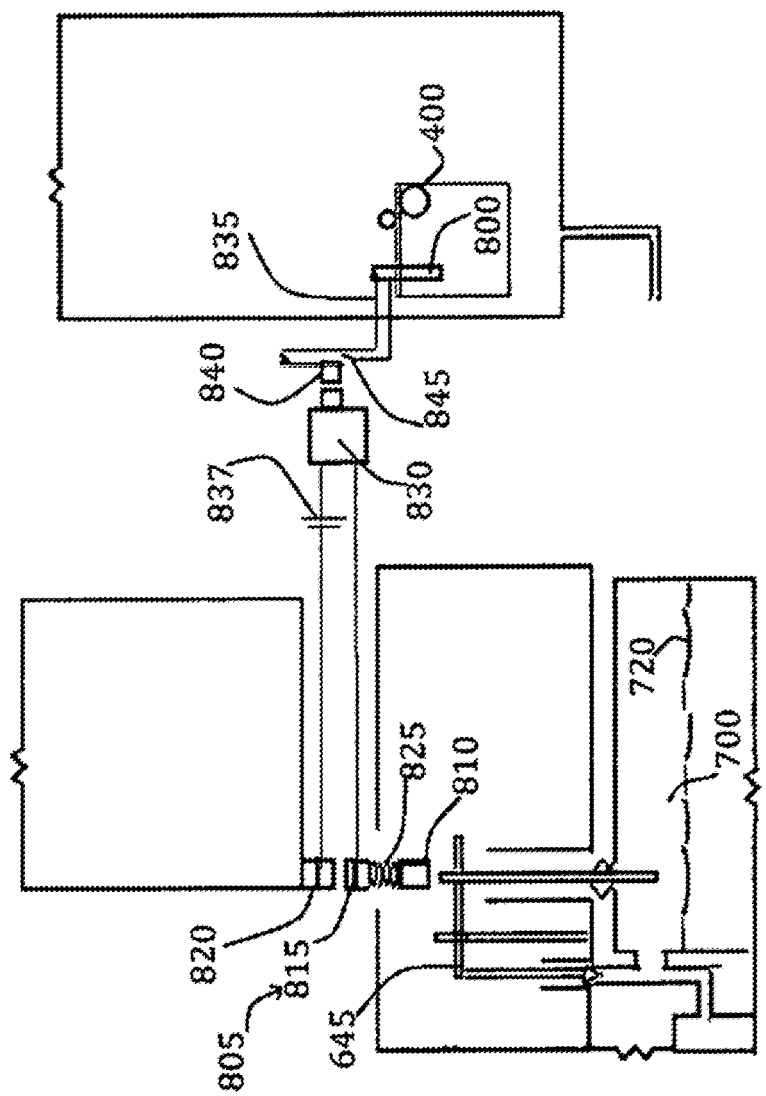
FIG. 2 shows a schematic view of an alternative embodiment of the invention.

FIG. 2 shows an alternative embodiment of the invention. Rather than a pilot light 305 as shown in FIG. 1, this embodiment employs an electric filament 800 disposed, as a heat source for heating fluid, in evaporator in evaporator 400. Electric filament provides about same power as pilot light 305.

Rather than being a constant heat source, electric filament 800 is energized when the fluid level in distillate tank 700 reaches a predetermined level. To this end, for example, when fluid in distillate tank 700 attains the level 720, flow regulator 645 causes switch 805 to close, thereby energizing a solenoid 830, which closes a circuit 835 for energizing filament 800.

More specifically, fluid level in distillate tank 700 influences flow regulator 645. Flow regulator against contact 645 drives a pin 810 against first contact 815 to overcome a bias with respect to, for making a second contact 820. A spring 825 may be interposed between pin 810 and first contact 815.

When switch 805 is closed, energy from a current source 837 is directed is to solenoid 830. Solenoid 830 drives a third contact 840 to overcome a bias with respect to, for making contact with a fourth contact 845, thereby closing circuit 835.

The foregoing description, for purpose of explanation, has been described with reference to specific embodiments. Control of system operations and components may be by an electronic control unit using feedback from transducers and/or sensors. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

In one embodiment the second fluid flow regulator can be included in the distillate tank 700. That is, float 715 can be disposed directly in the distillate tank 700. In one embodiment the distillate tank 700 can be connected to a reserve tank (not shown) for holding and storing larger amounts of distilled water. Alternatively the distillate tank 700 can be configured of an appropriate size to function as a reserve tank for distilled fluid. In another embodiment the distillate tank can be disposed with means for modifying water distillate in order to modify the hydrogen potential or Ph of the distillate.

In another embodiment said distillate tank 700 can be enabled with means to maintain liquid at a predetermined level in a tank located at a point of convenience such as a kitchen or refrigerator. Specifically, said level of liquid is maintained in said tank 700 by a pump 747 and where said distillate tank 700 located at said point of convenience can be enabled with a tap for enabling the flow of said distillate to a consumer's predetermined a receptacle or physical liquid containing enclosure. Alternately, said condenser tank 100 and said distillate tank 700 can be remotely positioned relative to main tank 200 thus, enabling availability of the distillate liquid by gravity of said distillate to a consumers predetermined location or said condenser tank 100 and said distillate tank 700 can be remotely positioned relative to main tank 200 thus, enabling availability of said distillate to a consumers predetermined location by mechanical means such as a pump 747. Condenser 100 and distillate tank 700 need not be proximal (e.g., not adjacent thereto) with main tank 200 and evaporator 400 as liquid vapor rises thus enabling location of said condenser 100 and distillate tank 700 at a height enabling gravity to cause said distillate to flow to a liquid containing receptacle and where said level of liquid in said liquid containing receptacle can be maintained by float valve, electro-mechanical means or activated manually by a tap or by other means. Said another way, the distillate tank 700 is operably configured to emit housed distillate to an outlet therefrom with either a pump or gravity-feeding.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. One embodiment enables modification for application to restaurants, yet another embodiment enables application for use in a hotel or related establishment. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. Apparatus for heating fluid and distilling fluid comprising:
   a main tank for containing fluid to be heated by a main gas heater, the main gas heater including a pilot light for heating the main tank;
   a condensing tank for passing fluid to the main tank;
   an evaporator tank for vaporizing fluid received therein, the evaporator tank being heated by the pilot light and disposed at a height lower than the condensing tank;

a condensing coil, disposed in the condensing tank, for exchanging heat between fluid vaporized by the evaporator tank and fluid in the condensing tank;

a holding tank for receiving fluid from a main source and fluidly coupled through a conduit to a delaying action tank operably configured to receive fluid from the holding tank; and a distillate tank for receiving condensed fluid from the condensing coil and including a deactivation tank fluidly coupled thereto, the distillate tank disposed at a height lower than a height of the condensing tank and operably configured to emit housed distillate to an outlet therefrom with gravity-feeding to a liquid receptacle.

2. The apparatus according to claim 1, wherein the holding tank further comprises:

a lever arm having a pivot point and coupled to a stopper on a side of the pivot point and operably configured open and close to prevent fluid from flowing from the holding tank and into the delaying action tank, the delaying action tank including a first float connected to a first shaft that is directly connected to the lever arm on a side of the pivot point opposite the side where the stopper is coupled, the first float operably configured to regulate fluid flow to the evaporator tank according to an amount of fluid in the delaying action tank.

3. The apparatus according to claim 2, wherein the deactivation tank further comprises:

a second float connected to a second shaft that is directly connected to the lever arm on the side of the pivot point where the first shaft is directly connected operably configured to result in same sense rotation.

4. The apparatus according to claim 1, wherein the evaporator tank is connected to the delaying action tank to receive fluid from the delaying action tank.

5. The apparatus according to claim 4, further comprising a pump connected to the distillate tank for pumping fluid from the distillate tank.

6. The apparatus according to claim 4, wherein a first fluid flow regulator regulates fluid flow to the evaporator tank by preventing or allowing fluid flow from the holding tank to the delaying action bowl tank.

7. The apparatus according to claim 3, wherein the first shaft having interval control flanges disposed to engage opposite sides of the lever arm that opens or closes the stopper that can prevent fluid from flowing from the holding tank into the delaying action tank.

8. The apparatus according to claim 7, wherein a second fluid flow regulator regulates fluid flow to the evaporator tank by regulating fluid flow from the holding tank to the delaying action tank.

9. The apparatus according to claim 8, wherein the second shaft having interval control flanges disposed to engage opposite sides of the lever arm that opens or closes the stopper that can prevent fluid from flowing from the holding tank into the delaying action tank.

10. The apparatus according to claim 3, further comprising a deactivation tank to receive overflow fluid from the distillate tank, the deactivation tank including L second fluid flow regulator for regulating fluid flow to the evaporator tank according to an amount of fluid in the distillate tank.

11. The apparatus according to claim 10, wherein the second shaft having interval control flanges disposed to engage opposite sides of the lever arm that opens or closes the stopper that can prevent fluid from flowing from the holding tank into the delaying action tank.

12. The apparatus according to claim 11, further comprising a pump connected to the distillate tank and the deactivation tank for pumping fluid from the distillate tank.

13. The apparatus according to claim 3, wherein the first shaft and the second shaft are disposed to engage the same side of said lever arm at different points on the same side of said lever arm resulting in reduce point stress on said lever arm.

14. The apparatus according to claim 3, wherein the first shaft and the second shaft are disposed to engage the same side of said lever arm at different points on the same side of said lever arm, said lever arm being disposed with means to open or close a stopper that can prevent fluid from flowing from the holding tank into the delaying action tank.

15. The apparatus according to claim 3, wherein the condensing tank contains one or more heat conducting rods that allow heat to be conducted to a lower region of the condensing tank.

16. Apparatus for heating fluid and distilling fluid comprising:

a main tank for containing fluid to be heated by a main gas heater;

a condensing tank for passing fluid to the main tank;

an evaporator tank for vaporizing fluid received therein and to be heated by the main gas heater;

a condensing coil, disposed in the condensing tank, for exchanging heat between fluid vaporized by the evaporator tank and fluid in the condensing tank;

a holding tank for receiving fluid from a main source and fluidly coupled through a conduit to a delaying action tank operably configured to receive fluid from the holding tank, the holding tank including a lever arm having a pivot point and coupled a stopper on a side of the pivot point and operably configured to open and close to prevent fluid from flowing from the holding tank and into the delaying action tank with a first float connected to a first shaft directly connected to the level arm on a side of the pivot point opposite the side where the stopper is coupled, the first float disposed within the delaying action tank operably configured to regulate fluid flow to the evaporator tank according to an amount of fluid in the delaying action tank; and a distillate tank for receiving condensed fluid from the condensing coil and including a deactivation tank fluidly coupled thereto and including a second float connected to a second shaft that is directly connected to the lever arm on the side of the pivot point where the first shaft is directly connected and operably configured to result in same sense rotation, the distillate tank operably configured to emit housed distillate to an outlet therefrom with either a pump or gravity-feeding.

17. The apparatus according to claim 16, wherein the main gas heater further comprising:

a pilot light for heating the main tank and the evaporator tank.

18. Apparatus for heating fluid and distilling fluid comprising:

a main tank for containing fluid to be heated by a main gas heater;

a condensing tank for passing fluid to the main tank;

an evaporator tank for vaporizing fluid received therein and to be heated by the main gas heater;

a condensing coil, disposed in the condensing tank, for exchanging heat between fluid vaporized by the evaporator tank and fluid in the condensing tank;

a holding tank for receiving fluid from a main source and fluidly coupled through a conduit to a delaying action tank operably configured to receive fluid from the holding tank, the holding tank including a lever arm having a pivot point and coupled a stopper on a side of the pivot point and operably configured to open and close to prevent fluid from flowing from the holding tank and into the delaying action tank with a first float connected to a first shaft directly connected to the level arm on a side of the pivot point opposite the side where the stopper is coupled, the first float disposed within the delaying action tank operably configured to regulate fluid flow to the evaporator tank according to an amount of fluid in the delaying action tank; and a distillate tank for receiving condensed fluid from the condensing coil and including a deactivation tank fluidly coupled thereto and including a second float connected to a second shaft that is directly connected to the lever arm on the side of the pivot point where the first shaft is directly connected and operably configured to result in same sense rotation.

19. The apparatus according to claim 18, wherein:

the distillate tank is operably configured to emit housed distillate to an outlet therefrom with either a pump or gravity-feeding.

\* \* \* \* \*